(12) United States Patent
Diveley et al.

(10) Patent No.: US 7,165,052 B2
(45) Date of Patent: Jan. 16, 2007

(54) PAYMENT SERVICE METHOD AND SYSTEM

(75) Inventors: Keith W. Diveley, Highlands Ranch, CO (US); Kurt Hansen, Castle Rock, CO (US)

(73) Assignee: First Data Corporation, Englewood, CO (US)

( * ) Notice: Subject to any disclaimer, the term of this patent is extended or adjusted under 35 U.S.C. 154(b) by 677 days.

(21) Appl. No.: 09/823,697

(22) Filed: Mar. 31, 2001

(65) Prior Publication Data

US 2002/0143709 A1 Oct. 3, 2002

(51) Int. Cl.
*G06F 17/60* (2006.01)

(52) U.S. Cl. .............................. 705/74; 705/14; 705/16; 705/26; 705/34; 705/35; 705/39; 705/40; 705/41; 705/42; 705/43; 705/44; 705/45; 705/65; 705/66; 705/67; 705/75; 705/76; 705/77; 705/78; 235/375; 235/376; 235/377; 235/378; 235/379; 235/380; 235/381; 379/114

(58) Field of Classification Search ................. 705/14, 705/16, 26, 34, 35, 39–45, 65–67, 74–78; 235/375–381; 379/114
See application file for complete search history.

(56) References Cited

U.S. PATENT DOCUMENTS

| | | |
|---|---|---|
| 3,599,151 A | 8/1971 | Harr |
| 3,783,755 A | 1/1974 | Lagin |
| 3,833,395 A | 9/1974 | Gosnell |
| 4,032,931 A | 6/1977 | Haker |
| 4,321,672 A | 3/1982 | Braun et al. |
| 4,454,414 A | 6/1984 | Benton |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |
| 4,722,554 A | 2/1988 | Pettit |
| 4,795,892 A * | 1/1989 | Gilmore et al. ............. 235/381 |
| 4,812,628 A | 3/1989 | Boston et al. |

(Continued)

FOREIGN PATENT DOCUMENTS

EP 0 481 135 A1 4/1992

(Continued)

OTHER PUBLICATIONS

Anonymous: "Western Union Service Growing." Bank Letter. New York: May 28, 1990. vol. 14, Iss 21: p. 8.*

(Continued)

*Primary Examiner*—James A Reagan
(74) *Attorney, Agent, or Firm*—Townsend and Townsend and Crew LLP

(57) ABSTRACT

A payment service method and system involve a payment service provider, a customer/payor and a client/payee. The customer/payor enrolls in the service and is provided the unique identifier which enables him or her to conduct all transactions with the payment service provider. The customer/payor interfaces with the payment service provider through various forms of communication, and can facilitate payments to the clients/payees through the payment service provider while remaining anonymous. Various enhancements are provided for promoting the services of the clients and the payment service provider to customer bases obtained from persons enrolled in the payment service and from persons who are customers of the clients.

28 Claims, 13 Drawing Sheets

BLOCK DIAGRAM

U.S. PATENT DOCUMENTS

| | | | |
|---|---|---|---|
| 4,902,881 A | 2/1990 | Janku | |
| 4,961,142 A | 10/1990 | Elliott et al. | |
| 4,972,318 A | 11/1990 | Brown et al. | |
| 5,021,967 A | 6/1991 | Smith | |
| 5,053,607 A | 10/1991 | Carlson et al. | |
| 5,119,293 A | 6/1992 | Hammond | |
| 5,175,682 A | 12/1992 | Higashiyama et al. | |
| 5,220,501 A | 6/1993 | Lawlor et al. | |
| 5,283,829 A | 2/1994 | Anderson | |
| 5,350,906 A | 9/1994 | Brody et al. | |
| 5,367,452 A | 11/1994 | Gallery et al. | |
| 5,408,077 A | 4/1995 | Campo et al. | |
| 5,426,594 A | 6/1995 | Wright et al. | |
| 5,448,043 A | 9/1995 | Nakano et al. | |
| 5,461,217 A | 10/1995 | Claus | |
| 5,464,971 A | 11/1995 | Sutcliffe et al. | |
| 5,465,206 A | 11/1995 | Hilt et al. | |
| 5,477,037 A | 12/1995 | Berger | |
| 5,477,038 A | 12/1995 | Levine et al. | |
| 5,484,988 A | 1/1996 | Hills et al. | |
| 5,491,325 A | 2/1996 | Huang et al. | |
| 5,504,677 A | 4/1996 | Pollin | |
| 5,510,979 A | 4/1996 | Moderi et al. | |
| 5,513,117 A | 4/1996 | Small | |
| 5,524,073 A | 6/1996 | Stambler | |
| 5,550,734 A * | 8/1996 | Tarter et al. | 705/2 |
| 5,555,496 A | 9/1996 | Tackbary et al. | |
| 5,570,465 A | 10/1996 | Tsakanikas | |
| 5,577,109 A | 11/1996 | Stimson et al. | |
| 5,604,802 A | 2/1997 | Holloway | |
| 5,622,388 A | 4/1997 | Alcordo | |
| 5,629,982 A | 5/1997 | Micali | |
| 5,638,283 A | 6/1997 | Herbert | |
| 5,649,117 A | 7/1997 | Landry | |
| 5,650,604 A | 7/1997 | Marcous et al. | |
| 5,657,201 A | 8/1997 | Kochis | |
| 5,677,955 A | 10/1997 | Doggett et al. | |
| 5,679,940 A | 10/1997 | Templeton et al. | |
| 5,699,528 A | 12/1997 | Hogan | |
| 5,717,868 A | 2/1998 | James | |
| 5,721,768 A | 2/1998 | Stimson et al. | |
| 5,732,136 A | 3/1998 | Murphree et al. | |
| 5,732,400 A | 3/1998 | Mandler et al. | |
| 5,745,886 A | 4/1998 | Rosen | |
| 5,757,917 A | 5/1998 | Rose et al. | |
| 5,764,888 A | 6/1998 | Bolan et al. | |
| 5,774,879 A | 6/1998 | Custy et al. | |
| 5,778,067 A | 7/1998 | Jones et al. | |
| 5,779,379 A | 7/1998 | Mason et al. | |
| 5,783,808 A | 7/1998 | Josephson | |
| 5,787,403 A | 7/1998 | Randle | |
| 5,794,207 A | 8/1998 | Walker et al. | |
| 5,815,657 A | 9/1998 | Williams et al. | |
| 5,825,617 A | 10/1998 | Kochis et al. | |
| 5,826,241 A | 10/1998 | Stein et al. | |
| 5,828,875 A | 10/1998 | Halvarsson et al. | |
| 5,832,463 A | 11/1998 | Funk | |
| 5,870,718 A | 2/1999 | Spector | |
| 5,875,435 A | 2/1999 | Brown | |
| 5,878,211 A | 3/1999 | Delagrange et al. | |
| 5,880,446 A | 3/1999 | Mori et al. | |
| 5,893,080 A | 4/1999 | McGurl et al. | |
| 5,896,298 A | 4/1999 | Richter | |
| 5,897,625 A | 4/1999 | Gustin et al. | |
| 5,897,989 A | 4/1999 | Beecham | |
| 5,898,154 A | 4/1999 | Rosen | |
| 5,899,980 A | 5/1999 | Wilf et al. | |
| 5,899,982 A | 5/1999 | Randle | |
| 5,902,983 A | 5/1999 | Crevelt et al. | |
| 5,903,881 A | 5/1999 | Schrader et al. | |
| 5,909,492 A | 6/1999 | Payne et al. | |
| 5,909,673 A | 6/1999 | Gregory | |
| 5,910,988 A | 6/1999 | Ballard | |
| 5,913,202 A | 6/1999 | Motoyama | |
| 5,915,023 A | 6/1999 | Bernstein | |
| 5,920,629 A | 7/1999 | Rosen | |
| 5,920,847 A | 7/1999 | Kolling et al. | |
| 5,920,848 A | 7/1999 | Schutzer et al. | |
| 5,923,016 A * | 7/1999 | Fredregill et al. | 235/380 |
| 5,937,396 A | 8/1999 | Konya | |
| 5,949,044 A | 9/1999 | Walker et al. | |
| 5,952,639 A | 9/1999 | Ohki et al. | |
| 5,953,709 A | 9/1999 | Gilbert et al. | |
| 5,953,710 A | 9/1999 | Fleming | |
| 5,960,412 A | 9/1999 | Tackbary et al. | |
| 5,963,647 A | 10/1999 | Downing et al. | |
| 5,974,146 A | 10/1999 | Randle et al. | |
| 5,974,194 A | 10/1999 | Hirani et al. | |
| RE36,365 E | 11/1999 | Levine et al. | |
| 5,987,426 A | 11/1999 | Goodwin, III | |
| 5,993,047 A | 11/1999 | Novogrod et al. | |
| 5,999,624 A | 12/1999 | Hopkins | |
| 6,003,763 A | 12/1999 | Gallagher et al. | |
| 6,011,833 A | 1/2000 | West | |
| 6,012,048 A | 1/2000 | Gustin et al. | |
| 6,015,087 A | 1/2000 | Seifert et al. | |
| 6,027,216 A | 2/2000 | Guyton | |
| 6,029,150 A | 2/2000 | Kravitz | |
| 6,030,000 A | 2/2000 | Diamond | |
| 6,032,133 A | 2/2000 | Hilt et al. | |
| 6,032,137 A | 2/2000 | Ballard | |
| 6,035,285 A | 3/2000 | Schlect et al. | |
| 6,035,406 A | 3/2000 | Moussa et al. | |
| 6,039,245 A | 3/2000 | Symonds et al. | |
| 6,039,250 A | 3/2000 | Ito et al. | |
| 6,044,360 A | 3/2000 | Picciallo | |
| 6,044,362 A | 3/2000 | Neely | |
| 6,045,039 A | 4/2000 | Stinson et al. | |
| 6,047,268 A | 4/2000 | Bartoli et al. | |
| 6,058,417 A | 5/2000 | Hess et al. | |
| 6,064,990 A | 5/2000 | Goldsmith | |
| 6,070,150 A | 5/2000 | Remington et al. | |
| 6,070,156 A | 5/2000 | Hartsell et al. | |
| 6,070,798 A | 6/2000 | Nethery | |
| 6,078,907 A | 6/2000 | Lamm | |
| 6,081,790 A | 6/2000 | Rosen | |
| 6,088,683 A | 7/2000 | Jalili | |
| 6,088,684 A | 7/2000 | Custy et al. | |
| 6,097,834 A | 8/2000 | Krouse et al. | |
| 6,098,053 A | 8/2000 | Slater | |
| 6,106,020 A | 8/2000 | Leef et al. | |
| 6,119,106 A | 9/2000 | Mersky et al. | |
| 6,119,931 A | 9/2000 | Novogrod | |
| 6,122,625 A | 9/2000 | Rosen | |
| 6,128,603 A | 10/2000 | Dent et al. | |
| 6,134,561 A | 10/2000 | Brandien et al. | |
| 6,145,738 A | 11/2000 | Stinson et al. | |
| 6,148,377 A | 11/2000 | Carter et al. | |
| 6,149,056 A | 11/2000 | Stinson et al. | |
| 6,164,528 A | 12/2000 | Hills et al. | |
| 6,167,386 A | 12/2000 | Brown | |
| 6,175,823 B1 | 1/2001 | Van Dusen | |
| 6,189,787 B1 | 2/2001 | Dorf | |
| 6,193,152 B1 | 2/2001 | Fernando et al. | |
| 6,199,761 B1 | 3/2001 | Drexler | |
| 6,202,054 B1 | 3/2001 | Lawlor et al. | |
| 6,206,283 B1 | 3/2001 | Bansal et al. | |
| RE37,122 E | 4/2001 | Levine et al. | |
| 6,223,168 B1 | 4/2001 | McGurl et al. | |
| 6,246,996 B1 | 6/2001 | Stein et al. | |
| 6,247,047 B1 | 6/2001 | Wolff | |
| 6,260,024 B1 | 7/2001 | Shkedy | |
| 6,263,446 B1 | 7/2001 | Kausik et al. | |
| 6,269,369 B1 | 7/2001 | Robertson | |

| | | |
|---|---|---|
| 6,275,829 B1 | 8/2001 | Angiulo et al. |
| 6,282,522 B1 | 8/2001 | Davis |
| 6,286,756 B1 | 9/2001 | Stinson et al. |
| 6,289,322 B1 | 9/2001 | Kitchen et al. |
| 6,292,789 B1 * | 9/2001 | Schutzer ............... 705/40 |
| 6,305,604 B1 | 10/2001 | Ono |
| 6,308,887 B1 | 10/2001 | Korman et al. |
| 6,314,169 B1 | 11/2001 | Schelberg, Jr. et al. |
| 6,317,745 B1 | 11/2001 | Thomas et al. |
| 6,321,211 B1 | 11/2001 | Dodd |
| 6,321,984 B1 | 11/2001 | McCall et al. |
| 6,327,570 B1 | 12/2001 | Stevens |
| 6,327,575 B1 | 12/2001 | Katz |
| 6,334,108 B1 | 12/2001 | Deaton |
| 6,343,279 B1 | 1/2002 | Bissonette et al. |
| 6,347,305 B1 | 2/2002 | Watkins |
| 6,360,254 B1 | 3/2002 | Linden et al. |
| 6,367,693 B1 | 4/2002 | Novogrod |
| 6,386,444 B1 * | 5/2002 | Sullivan ............... 235/379 |
| 6,394,343 B1 | 5/2002 | Berg et al. |
| 6,408,284 B1 | 6/2002 | Hilt et al. |
| 6,411,942 B1 | 6/2002 | Fujimoto |
| 6,415,271 B1 | 7/2002 | Turk et al. |
| 6,438,586 B1 | 8/2002 | Hass |
| 6,449,599 B1 | 9/2002 | Payne et al. |
| 6,453,300 B1 | 9/2002 | Simpson |
| 6,473,500 B1 | 10/2002 | Risafi et al. |
| 6,484,936 B1 | 11/2002 | Nicoll et al. |
| 6,488,203 B1 | 12/2002 | Stoutenburg et al. |
| 6,502,747 B1 | 1/2003 | Stoutenburg et al. |
| 6,510,453 B1 | 1/2003 | Apfel et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,601,038 B1 * | 7/2003 | Kolls ............... 705/14 |
| 6,609,113 B1 | 8/2003 | O'Leary et al. |
| RE38,255 E | 9/2003 | Levine et al. |
| 6,618,705 B1 | 9/2003 | Wang et al. |
| 6,736,314 B1 | 5/2004 | Cooper et al. |
| 6,761,309 B1 | 7/2004 | Stoutenburg et al. |
| 6,761,311 B1 | 7/2004 | Algiene et al. |
| 6,814,282 B1 | 11/2004 | Seifert et al. |
| 6,827,260 B1 | 12/2004 | Stoutenburg et al. |
| 6,829,588 B1 | 12/2004 | Stoutenburg et al. |
| 6,847,947 B1 | 1/2005 | Kambour et al. |
| 6,886,742 B1 | 5/2005 | Stoutenburg et al. |
| 6,908,031 B1 | 6/2005 | Seifert et al. |
| 6,922,673 B1 | 7/2005 | Karas et al. |
| 2001/0032878 A1 | 10/2001 | Tsiounis et al. |
| 2001/0042785 A1 | 11/2001 | Walker et al. |
| 2001/0051876 A1 | 12/2001 | Seigel et al. |
| 2001/0054003 A1 | 12/2001 | Chien et al. |
| 2002/0016769 A1 | 2/2002 | Barbara et al. |
| 2002/0023055 A1 | 2/2002 | Antognini et al. |
| 2002/0032653 A1 | 3/2002 | Schutzer |
| 2002/0046106 A1 | 4/2002 | Ishibashi et al. |
| 2002/0062285 A1 | 5/2002 | Amann |
| 2002/0087337 A1 * | 7/2002 | Hensley ............... 705/1 |
| 2002/0087462 A1 | 7/2002 | Stoutenburg et al. |
| 2002/0087463 A1 | 7/2002 | Fitzgerald et al. |
| 2002/0087467 A1 | 7/2002 | Muscavage et al. |
| 2002/0087469 A1 * | 7/2002 | Ganesan et al. ............... 705/40 |
| 2002/0104026 A1 | 8/2002 | Barra et al. |
| 2002/0111908 A1 | 8/2002 | Milberger et al. |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0161702 A1 | 10/2002 | Milberger et al. |
| 2003/0024979 A1 | 2/2003 | Hansen et al. |
| 2003/0028491 A1 | 2/2003 | Cooper |
| 2003/0055689 A1 | 3/2003 | Block et al. |
| 2003/0055780 A1 | 3/2003 | Hansen et al. |

| | | |
|---|---|---|
| 2003/0061171 A1 | 3/2003 | Gilbert et al. |
| 2003/0069856 A1 | 4/2003 | Seifert et al. |
| 2003/0111529 A1 | 6/2003 | Templeton et al. |
| 2003/0120777 A1 | 6/2003 | Thompson et al. |
| 2003/0126036 A1 | 7/2003 | Mascavage et al. |
| 2003/0126075 A1 | 7/2003 | Mascavage et al. |
| 2003/0126083 A1 | 7/2003 | Seifert et al. |
| 2003/0130907 A1 | 7/2003 | Karas et al. |
| 2003/0130940 A1 | 7/2003 | Hansen et al. |
| 2003/0130948 A1 | 7/2003 | Algiene et al. |
| 2003/0135459 A1 | 7/2003 | Abelman et al. |
| 2003/0149662 A1 | 8/2003 | Shore |
| 2003/0154164 A1 | 8/2003 | Mascavage et al. |
| 2003/0167237 A1 | 9/2003 | Degen et al. |
| 2003/0177067 A1 | 9/2003 | Cowell et al. |
| 2003/0187789 A1 | 10/2003 | Karas et al. |
| 2003/0187791 A1 | 10/2003 | Weichert et al. |
| 2003/0187792 A1 | 10/2003 | Hansen et al. |
| 2003/0195811 A1 | 10/2003 | Hayes et al. |
| 2003/0208445 A1 | 11/2003 | Compiano |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2004/0015438 A1 | 1/2004 | Compiano |
| 2004/0024701 A1 | 2/2004 | Hansen et al. |
| 2004/0059672 A1 | 3/2004 | Baig et al. |
| 2004/0068437 A1 | 4/2004 | McGee et al. |
| 2004/0078327 A1 | 4/2004 | Frazier et al. |
| 2004/0088248 A1 | 5/2004 | Cutler |
| 2004/0088261 A1 | 5/2004 | Moore et al. |
| 2004/0098328 A1 | 5/2004 | Grant et al. |
| 2004/0098335 A1 | 5/2004 | Michelsen |
| 2004/0107165 A1 | 6/2004 | Blair et al. |
| 2004/0117302 A1 | 6/2004 | Weichert et al. |
| 2004/0138947 A1 | 7/2004 | McGee et al. |
| 2004/0139008 A1 | 7/2004 | Muscavage et al. |
| 2004/0143552 A1 | 7/2004 | Weichert et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0167860 A1 | 8/2004 | Baxter et al. |
| 2004/0193897 A1 | 9/2004 | Van Volkenburgh |
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0211831 A1 | 10/2004 | Stoutenburg et al. |
| 2004/0254833 A1 | 12/2004 | Algiene et al. |
| 2005/0017067 A1 | 1/2005 | Weinberger |
| 2005/0167481 A1 | 8/2005 | Hansen et al. |
| 2005/0180550 A1 | 8/2005 | McGee et al. |
| 2005/0187929 A1 | 8/2005 | Staggs |
| 2005/0209958 A1 | 9/2005 | Michelsen |
| 2005/0209961 A1 | 9/2005 | Michelsen |

FOREIGN PATENT DOCUMENTS

| | | |
|---|---|---|
| EP | 0 745 961 A2 | 4/1996 |
| EP | 0 745 961 A3 | 7/1998 |
| EP | 0 949 596 A2 | 10/1999 |
| EP | 1 077 436 A2 | 2/2001 |
| FR | 2728983 A1 | 7/1996 |
| NL | 700023 A1 * | 8/1995 |
| WO | WO 96/26508 A1 | 8/1996 |
| WO | WO 98/49644 A1 | 11/1998 |
| WO | WO 98/50875 A2 | 11/1998 |
| WO | WO 99/22291 A1 | 5/1999 |
| WO | WO 99/28872 A1 | 6/1999 |
| WO | WO 00/22559 A1 | 4/2000 |
| WO | WO 00/46725 A1 | 8/2000 |
| WO | WO 00/54122 A2 | 9/2000 |
| WO | WO 00/54122 A3 | 9/2000 |
| WO | WO 00/67177 A2 | 11/2000 |

| | | |
|---|---|---|
| WO | WO 00/79452 A2 | 12/2000 |
| WO | WO 01/04816 A1 | 1/2001 |
| WO | WO 01/33522 A1 | 5/2001 |
| WO | WO 01/39093 A1 | 5/2001 |
| WO | WO 01/75744 A1 | 10/2001 |
| WO | WO 01/86600 A2 | 11/2001 |
| WO | WO 02/05195 A1 | 1/2002 |

OTHER PUBLICATIONS

Anonymous: "Payment Systems: Western Union Service for Overdue Accounts Resolving Delinquent Cards." Card News. Potomac: Aug. 13, 1190. vol. 5, Iss 15; p. 4.*
Cornwell, Ted. "Western Union Reports Growth in Late Payment Collection Service" May 5, 1997. National Mortgage News. New York: vol. 21 Iss 31; p. 64.*
Cornwell, Ted: "Western Union Reports Growth in Late payment Collection Service." National Mortgage News. New York. May 5, 1997. vol. 21; p. 64.*
Anonymous: "Payment Systems: Western Union Service for Overdue Accounts Resolving Delinquent Cards." Card News. Potomac: Aug. 13, 1990. vol. 5, Iss 15; p. 4.*
Business Wire, "E-Commerce, Email and E-greeting Cards Combine in New Web Site Designed by Interactive Bureau; Flooz.com Features a Fun Online Gift Currency You Send by Email for Any Occasion", downloaded from website http://www.proquest.umi.com, 2 pages.
DOTBANK, *The Way to Send and Receive Money on the Internet*, downloaded from website http://www.dotbank.com, Feb. 7, 2000, 7 pages.
http://www.vfi-finance.com/tranz330.htm, Tranz 330 Fast, Low-Cost Transaction Automation At The Point Of Service, VeriFone Finance, Jan. 1999, pp. 1-3, especially pp. 1-2, 2 pages.
Lawton, George; "Biometrics: A New Era in Security"; 1998, Computer, vol. 31, No. 8, pp. 16-18.
Stockel, Anna; "Securing Data and Financial Transactions"; 1995, Institute of Electrical and Electronics Engineers 29th Annual Conference, pp. 397-401.
TRANSPOINT, "The Way to Pay Online", downloaded from website http://www.transpoint.com/ on Feb. 10, 2000, 12 pages.
x.com, Do More with Your Money, downloaded from website http://www.x.com., Feb. 7, 2000, 5 pages.
Press Release: "Western Union Announces ATM Card Payout for Money Transfer Transactions"; 2001, URL: http://news.firstdata.com/media/ReleaseDetail.cfm?ReleaseID=849995>.
Levin, Gary; "Western Union not fading into sunset; new services are added as telegrams drop"; 1992, 2 pages.
"Quick Collect"; Western Union Training Guide; 2004, 10 pages.
"Send your payment using Western Union Quick Collect"; 2 pages.
"Purchasing American Airlines Tickets Just Got Easier"; 2005, 4 pages.
"Lan Airline Alliance Carriers and Western Union Offer Travelers Additional Payment Options"; 2005, 3 pages.
Quick Collect: Government/Child Support Agency Name, Training Guide; 2004, 8 pages.
"Western Union Quick Collect; 3 Easy Ways to Send a Payment: In Person, Online or by Phone!"; 2 pages.
"Western Union: Now, using our service is even more rewarding"; 1 page.
"To send a Quick Collect Payment"; sample form, 1 page.
"Western Union: Some Quick Facts about Quick Collect"; 1 page.
"Quick Collect Sales Presentation"; 28 pages.
"Western Union Quick Collect"; 2 pages.
"Why Send Your Customers Across Town When You Can Send Them Next Door?"; 2005, 1 page.
"There's a lot to be said about the many advantages of the Quick Collect service. And look who's saying it."; 4 pages.
"If you're not getting your payment with Quick Collect, chances are you're not getting it"; 2001, 2 pages.
"Western Union: Ford Credit Phone Pay-How does it work?", 2001, 1 page.
Western Union Quick Collect: The Fastest way to collect good funds; 1999, 11 pages.
"Only Western Union"; 2 pages.
"Announcing Quick Collect Online"; 2002, Western Union's Professional Collector, 3 pages.
"When you're helping a customer make a crucial payment there's no room for guesswork"; 2002, Western Union's Professional Collector, 3 pages.
"Western Union Quick Collect: The most agents, the most locations, the most experienced"; 2000, 2 pages.
"It takes a certain person to make a good collector. But it takes a good manager to make a champion"; 2001, Western Union's Professional Collector, 3 pages.
"Nationwide Credit Collectors Act Globally"; 2001, Western Union's Professional Collector, 3 pages.
"Guess What? The check's not in the mail"; 2001, Western Union's Professional Collector, 3 pages.
"Quick Cash and Quick Collect: Western Union's money-movers"; 1990, *Newsbriefs*, vol. 2, No. 1, 3 pages.
You're sending more than a payment: Point-of-Sale & Merchandising Support Advertising Materials, 2 pages.
"Company Profile: The Western Union Convenience Pay Service"; 2004, 4 pages.
"You're sending more than a payment: You're sending peace of mind"; 2004, 3 pages.
"SBC Communications adds Western Union Locations for Walk-in Customer Bill Payments"; SBC News Release, 2 pages.
"Send Your Utility Bill Payment from Here!"; 3 pages.
"Rhode Island becomes first state to accept child support payments at Western Union: More than 50 Western Union Convenience Pay Agent Locations Offer New Level of Convenience to Rhode Island Residents Who Pay Child Support-"; 2002, 3 pages.
"Rhode Island becomes first state to accept child support payments at Western Union: Government Payment Leader govONE Solutions Adds Walk-in to Full Suite of Payment Options"; 2002, 3 pages.
"State of Hawaii to Accept Child Support Payments at Western Union"; 2004, 2 pages.
"Annual Report of the President of the Western Union Telegraph Company"; 1873, pp. 8-11.
"First located example of a money transfer"; Aug. 25, 1873, 1 page.
"Annual Report of the President of the Western Union Telegraph Company"; 1874, pp. 8-11.
"The Western Union Telegraph Company: Rules for Money Transfer Service"; 1908, pp. 3-25.
"The Western Union Telegraph Company: Delivery Department Instructions"; 1926, Commercial Bulletin No. 9-A, 2 pages.
"The Western Union Telegraph Company:Instructions for Receiving Clerks"; 1929, Commercial Bulletin No. 37-A, 2 pages.
"Annual Report of the Western Union Telegraph Company"; 1935, 2 pages.
"Dots and Dashes"; 1935, vol. 11, No. 9, 4 pages.
"Annual Report of the Western Union Telegraph Company"; 1940, pp. 9 and 22.
"Annual Report of the Western Union Telegraph Company"; 1947, 2 pages.
"Annual Report of the Western Union Telegraph Company"; 1949, 2 pages.
"Annual Report of the Western Union Telegraph Company"; 1951, 2 pages.
"Annual Report of the Western Union Telegraph Company"; 1953, 2 pages.
"Annual Report of the Western Union Telegraph Company"; 1954, 3 pages.
"Annual Report of the Western Union Telegraph Company"; 1973, 5 pages.
"Annual Report of the Western Union Telegraph Company"; 1974, 2 pages.
"Quarterly Report, 1st Quarter of the Western Union Telegraph Company"; 1978, 2 pages.
"Annual Report of the Western Union Telegraph Company"; 1981, 2 pages.
"Amex Money Order Dispenser"; 1990, The Nilson Report, 1 page.
"Quick Cash and Quick Collect: Western Union's money-movers"; 1990, Newsbriefs, vol. 2, No. 1, 3 pages.

"Western Union's Would-Be Rival"; 1990, American Banker, 1 page.
"American Express in New Ad Drive"; 1990, American Banker, 1 page.
"American Express Unit Introduces State-Of-The-Art Automated Money Order Dispenser"; 1990, Tri-State Food News, 1 page.
"Annual Report of the Western Union Corporation"; 1990, 4 pages.
"Collection by Money Transfer: MoneyGram Service Removes Time-Consuming Steps to Commercial Collections"; 1990, Collector, p. 36.
"Amex tests Moneygram"; 1990, Adnews, 1 page.
"Amex aims expansion strategy at local currency exchanges"; 1990, Crain's Chicago Business, 1 page.
"Sending Cash in a Flash"; 1990, Travel & Leisure, p. 42.
". . . And a Nine-Second Money Order Dispenser"; 1991, Post-News, vol. 17, No. 1, 1 page.
"Money-wire giants battle for business: Currency exchanges wooed"; 1991, Chicago Sun Times, 2 pages.
"Sending Cash in a Flash: There are more ways to do it than you might think"; 1991, 2 pages.
"Loved one stranded? Send Cash"; 1991, Akron Beacon Journal, 2 pages.
"Common Values: Uncommon Opportunities"; 1995, First Data Corporation Annual Report, 2 pages.
"Behind the Scenes of Life"; 1996, First Data Corporation Annual Report, 3 pages.
"First Data InfoSource Offers Database Analysis with DecisionScope"; 1996, First Data Corporation News Release, 2 pages.
First Data and Netscape Offering Internet Payment Processing Service; 1996, First Data Corporation News Release, 3 pages.
"CES/NaBANCO Introduces Stored Value Card Technology: Blockbuster Video is First Merchant Partner"; 1996, First Data Corporation News Release, 3 pages.
"First Data to Offer Card Profitability Software from HNC: Distribution Agreement Poised to Repeat Falcon Success"; 1996, HNC Software, Inc. News Release, 3 pages.
"VIPS Introduces MCSource to Managed Healthcare Industry"; 1996, VIPS Healthcare Information Systems News Release, 2 pages.
"Leading Provider of Transaction Card Processing Selects Connect Oneserver Software as a Solution for Advanced Internet Merchant Services: First Data Chooses OneServer as an Application to Deliver the Internet to Banks and Merchants"; 1996, press Release, 4 pages.
"Netscape Announces Netscape Livepayment to Facilitate Internet Commerce"; 1996, Netscape News Release, 4 pages.
"Stream , LitleNet, BBN, and KPMG Announce Industry-Wide Initiative to Enable Wide-Scale Software Electronic Commerce"; 1996, News Release, 6 pages.
"First Data and Netscape Announce Program to Help Businesses Establish Payment-Enabled Web Sites"; 1996, First Data Corporation News Release, 5 pages.
"FDR to Offer HNC Software's Real-Time Fraud Detection: New distribution Agreement to Benefit Card Banks"; 1996, First Data Resources News Release, 3 pages.
"First Data Aligns with CyberCash to Offer New Electronic Coin Service"; 1996, First Data Corporation News Release, 3 pages.
"First Data, First USA Paymentech, GE Capital Invest in First Virtual Holdings"; 1996, First Virtual Holdings Corporation News Release, 3 pages.
"Annual Report of First Data Corporation"; 1998, 3 pages.
"Annual Report of First Data Corporation"; 1999, 2 pages.
"American Express Introduces Automated Money Order Dispenser"; 1991, Professional Check Casher, 1 page.
"Western Union Payment Services, Bidpay and Quick Collect, Online Bill Payment, Online Auction Payments"; http://www.westernunion.com/info/osComparePayment.asp, 2 pages.
"About Western Union: Company History"; http://www.payment-solutions.com/history.html, 2 pages.
"Western Union Money Transfer Services, Send Money Online, Money Orders, Send Telegrams"; http://www.westernunion.com/info/osCompareMoneyMessage.asp, 2 pages.

"Quick Pay: The Convenient and reliable way to receive payments from customers worldwide"; http://www.payment-solutions.com/quickpay.html, 3 pages.
Quick Cash: A safe and reliable way to send funds around the world; http://www.payment-solutions.com/quickcash.html, 1 page.
"Signature Services: Helping financial institutions send funds faster"; http://www.payment-solutions.com/signature.html, 1 page.
"American Express Money Orders, Travelers Cheques Now on Sale"; 1936, Dots and Dashes, 2 pages.
List of Prepaid Services; http://www.westernunion.com/info/osComparePrePaid.asp, 1 page.
"Get your Collect Card"; 1939, Dots and Dashes, 2 pages.
Picture of Bill payment form or advertisement, 1 page.
"NTS Completes Merger with EDS Fleet Services; New First Data Unit Sets Sights on New Markets"; 1996, NTS Press Release, 3 pages.
Transfers require ID made by telephaph: 1895, Tariff Book, 4 pages.
American Greeting Cards Click-Through; 38 pages.
"MoneyZap.com Greeting Card Process Flow"; 2000, 2 pages.
"Western Union/Money Zap: Send and receive money easily over the internet"; http://www.moneyzap.com/main.asp, 23 pages.
"Western Union Gift Greetings"; 6 pages.
"PayPal: The way to send and receive money online"; 4 pages.
"Aeromexico and Western Union Partner to Offer a Cash Payment Option for Booking Airline Tickets"; 2004, Press Release, 2 pages.
"Western Union and Continental Airlines Introduce New Quick and Easy Cash Payment Option When Booking Flights"; 2004, Press Release, 4 pages.
"Purchasing American Airlines Tickets Just Got Easier"; 2004, Press Release, 4 pages.
"LAN Airline Alliance Carriers and Western Union offer Travellers Additional Payment Options"; 2005, Press Release, 3 pages.
"Western Union Financial Services, Inc.: Benefits Quick Cash Agreement and Disclosure Statement"; 1998, 2 pages.
"Western Union Financial Services, Inc.: Cash Card Agreement and Disclosure Statement"; 1998, 2 pages.
"Federal Benefits Checks are Going Away-Don't Let Your Customers Go with Them: Announcing the Western Union Benefits Quick Cash Program"; 4 pages.
"Introducing the Western Union Cash Card Program"; 1998, 2 pages.
"Western Union Creates Phone Card with BLT Technologies"; 1997, PR Newswire Association, 2 pages.
"AT&T Wireless to Offer Western Union SwiftPay as Replenishment Option for AT&T Free2Go Wireless Prepaid Customers"; 2001, PR Newswire Association, 2 pages.
"New Western Union SwiftPay Service Continues Expansion of Consumer-to-Business Payment Options"; 1999, PR Newswire Association, 2 pages.
"Western Union SwiftPay Selected by Sheakley Uniservice to Complete W-2 Reprint Transactions"; 2000, PR Newswire Association, 2 pages.
"Rhode Island becomes First State to Accept Child Support Payments at Western Union: More that 50 Western Union Convenience Pay Agent Locations Offer New Level of Convenience to Rhode Island Residents Who Pay Child Support"; 2002, Press Release, 3 pages.
"Rhode Island becomes First State to Accept Child Support Payments at Western Union: Government Payment Leader govONE Solutions Adds Walk-in to Full Suite of Payment Options"; 2002, Press Release, 3 pages.
"SBC Communications Adds Western Union Locations for Walk-In Customer Bill Payments"; 2005, Press Release, 2 pages.
"Western Union Money Orders More Popular Than Ever": 1942, Dots and Dashes, vol. 18, No. 3, 2 pages.
"Refund of Money Transfers"; 1913, Journal of the Telegraph, 2 pages.
Western Union Credit Card; 1915, 4 pages.
How money by phone was paid;; Money Transfer Service: Book of Rules and List of Offices; 1926, Western Union Telegraph Company, 3 pages.
"Pilgrims Started Thanksgiving Custom"; Dots and Dashes, vol. IV, No. 11, 2 pages.

"The Yellow Blank is Correct for every social need"; 1930, Western Union Booklet, 2 pages.
"Last of the Pony Express Riders Tells His Story"; 1932, Dots and Dashes, vol. 8, No. 10, 2 pages.
"Nation Receives Time Over Western Union Network"; 1931, Dots and Dashes, vol. 7, No. 5, 2 pages.
"Collect your delinquent accounts by Telegraph"; 1933, Form 1229-A, 1 page.
"Reynolds Arcade was Western Union Birthplace"; 1933, Dots and Dashes, vol. 9, No. 8, 2 pages.
"Messenger Work Full of Adventure, Excitement"; 1933, Dots and Dashes, vol. 9, No. 11, 2 pages.
Shopping Order service and gift service; 1934, Western Union Telegraph Company, Money Order Book, 6 pages.
Money Orders by Phone; 1935, Fortune Magazine, 3 pages.
"The Yellow Blank: When, Why, How to Use It"; 1934, 5 pages.
Money Order with confirmation; 1948, 1 page.
"Western Union Products and Services: a brief description"; 1960, 22 pages.
Survey of services; 1960, pp. 2-31.
Western Union News Supplement: Automatic travelers checks using Western Union; 1975, 2 pages.
Western Union New Supplement: Money Orders delivery through Mailgram: 1975, 2 pages.
Candygram payment service, 1 page.
Remittance for order sent via Western Union; 1933, 2 pages.
Western Union Telegraph Company; 1933, Money Order Message.
Gift: Money Order for something you really want: 1933, 1 page.
Holiday Greeting by Western Union; 1933, 1 page.
Western Union Money Transfer, Form 72-A, 1933, 1 page.
Western Union Foreign Transfer Order, Form 72-A, 1933, 1 page.
Western Union Domestic Transfer Order, Form 72-A, 1933, 1 page.
Western Union Gift Orders: A Practical Answer to the Christmas Gift Problem, 1933, 1 page.
Western Union Gift Orders: The Sensible, Convenient Way to take care of your Christmas Shopping; 1933, 1 page.
Shopping Order by Western Union, 1933, 1 page.
Western Union Shopping Order, 1933, 2 pages.
Western Union Hotel-Motel Reservation Service, 1 page.
bidpay.com: Whois search results; 2003, http://www.networksolutions.com/en_US/whois/results.jhtml;jsessionid+VZDZVYDD1J, 2 pages.
"billserv.com Launches bills.com, an internet Portal for Consumers to Pay All Bills Online at No Cost"; 2000, Business Wire, 2 pages.
First Data Acquires PaySys International; 2001, Press Release, 2 pages.
Luxury Brands LLC: WOrld Famous Brands at Liquidation Process; http://www.auctionbytes.com/cab/pages/payment. 3 pages.
PayPal for the Palm; http://handheldnews.com/file.asp?ObjectID=5401, 2 pages.
PayPal.com Case Study; http://fox.rollins.edu/~slackman/PayPal.htm, 2003, 7 pages.
PayPal-News; http://www.ndrys.com/paypal.html, 2003, 3 pages.
Hoffman, Karen Epper; "PayPal Still Running Free"; 2003, Bank Technology News, 3 pages.
Latour, Almar: "PayPal Electronic Plan May be on the Money in Years to Come"; 1999, The Wall Street Journal, 2 pages.
Plotkin, Hal; "Beam Me up Some Cash": 1999, Silicon Valley Insider, 3 pages.
Boneh, Dan: "Beaming Money by Email is Web's Next Killer App"; 1999, PR Newswire, 4 pages.
BidPay: Seller FAQs—Receiving Payments and Using the Money Order Service; 7 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Steiner, Ina: "PayPal Online Payment Service—Another Way to Pay for Auction Items"; 2000, Auction Bytes, 4 pages.
Steiner, Ina: "Accepting Credit Cards When You Sell Items: ProPay and Billpoint Payment Services"; 2000 Auction Bytes, 4 pages.
Wermer, Sandra; "A million credit card transactions in five hours"; 1997, Primeur, 2 pages.
"PaySys signs up four Asian distributors"; 1997 Orlando Business Journal, 3 pages.
Products and Services for PaySys, 2 pages.
VisionPLUS Consumer Payment Solution Overview, 2 pages.
PaySys—company overview, 2 pages.
State of New York Banking Department: Staff Letters and Memoranda: 2000, http://www.banking.state.ny.us/lo000718.htm, 2 pages.
Wijnen, Rene; You've Got Money!; 2000, Bank Technology News, vol. 13, No. 6, 4 pages.

* cited by examiner

*CLIENT CUSTOMER BASE ENROLLMENT*

PAYMENT PARAMETERS

DYNAMIC CLIENT/
CUSTOMER INTERFACE

*ADVERTISING/COUPON ON RECEIPT*

AUTOMATIC REPEAT CUSTOMER DISCOUNT

TRANSACTION METERING

CLIENT REBATE

*ALTERNATIVE PAYMENT METHODS*

ADDITIONAL PRODUCT SUPPORT

*CLIENT-SPECIFIC ENROLLMENT*

PAYMENT SERVICE METHOD AND SYSTEM

BACKGROUND OF THE INVENTION

1. Field of the Invention

The present invention relates generally to financial transaction systems and methodologies, and in particular to a system and method for making payments based on a customer identification.

2. Description of the Related Art

A wide variety of payment methods are available to consumers of goods and services. In addition to currency, consumers are often able to use their credit in making purchases. A common system for making credit purchases involves the use of a credit card provided by a credit card issuer, such as a commercial bank or other financial institution. Non-credit transactions can be handled by debit cards, which utilize funds already deposited by the consumer for payment purposes.

Many types of payment methodologies are dependent upon customers having relationships with financial institutions such as banks, credit unions, etc. However, a substantial percentage of consumers do not use such conventional financial institutions. These consumers are often referred to as "unbanked" because they do not maintain accounts with such institutions. Unbanked consumers are often inconvenienced in making financial transactions. For example, without bank accounts, they experience difficulty and inconvenience in obtaining negotiable instruments, making purchases on credit, etc.

Recently there have been a number of new products which provide at least partial solutions to the problems of the unbanked and other consumers. For example, "prepay" cards allow consumers to pre-purchase various goods and services. An important example relates to the use of telecommunications services, which are available through prepaid "calling cards". Many consumers prepay on a monthly basis for "dial tone" service. Prepaid cards can also be reloadable whereby additional value can be added by consumers for using their cards indefinitely.

Another prior art payment system involves the use of payment service providers making payments on behalf of consumers over the Internet global computer network or by negotiable instrument. Such a payment service is available from Western Union Commercial Services under its trademark QUICK COLLECT®. This product allows consumers to make payments to Western Union agents who the transfer funds either over the Internet global computer network or issue negotiable instruments to the payees on behalf of the customers/payors. Heretofore there has not been available a payment service method and system with the advantages and features of the present invention.

SUMMARY OF THE INVENTION

In the practice of the present invention a payment service provider contracts with its client to facilitate payments and prepayments on account from their customers. The customers enroll in the service by communicating with the payment service provider through any one of a number of different interfaces. A unique identification is assigned to each customer and can consist of any suitable character string or similar unique identifier. For example, customers using the payment service for their telephone bills can utilize their telephone numbers as their identifiers. Commercial clients can pre-enroll their entire customer databases with the payment service provider. The payment service provider then simply issues the identifications and processes applications for enrollment from customers. The payment service provider, or its agents, receive payments from the customers and process same for payment to the clients. The invention accommodates a variety of options and enhancements for customizing and expanding the service.

OBJECTS AND ADVANTAGES OF THE INVENTION

The principle objects and advantages of the present invention include:

1. providing a payment method and system;
2. providing such a payment method and system which utilize a payment service provider with an agent network;
3. providing such a payment method and system which facilitate payment to clients from the clients' customers;
4. providing such a payment method and system which enables customers to contact and enroll in same through a variety of different interfaces;
5. providing such a payment method and system which facilitate promoting the use of the payment system and method;
6. providing such a payment method and system which promote the products of the payment service provider's clients;
7. providing such a payment method and system which are adapted for promoting and cross selling other products of the payment service provider and its clients;
8. providing such a payment method and system which capture transactional data for use in managing a customer database; and
9. providing such a payment method and system which are efficient in operation and particularly well adapted for the proposed uses thereof Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
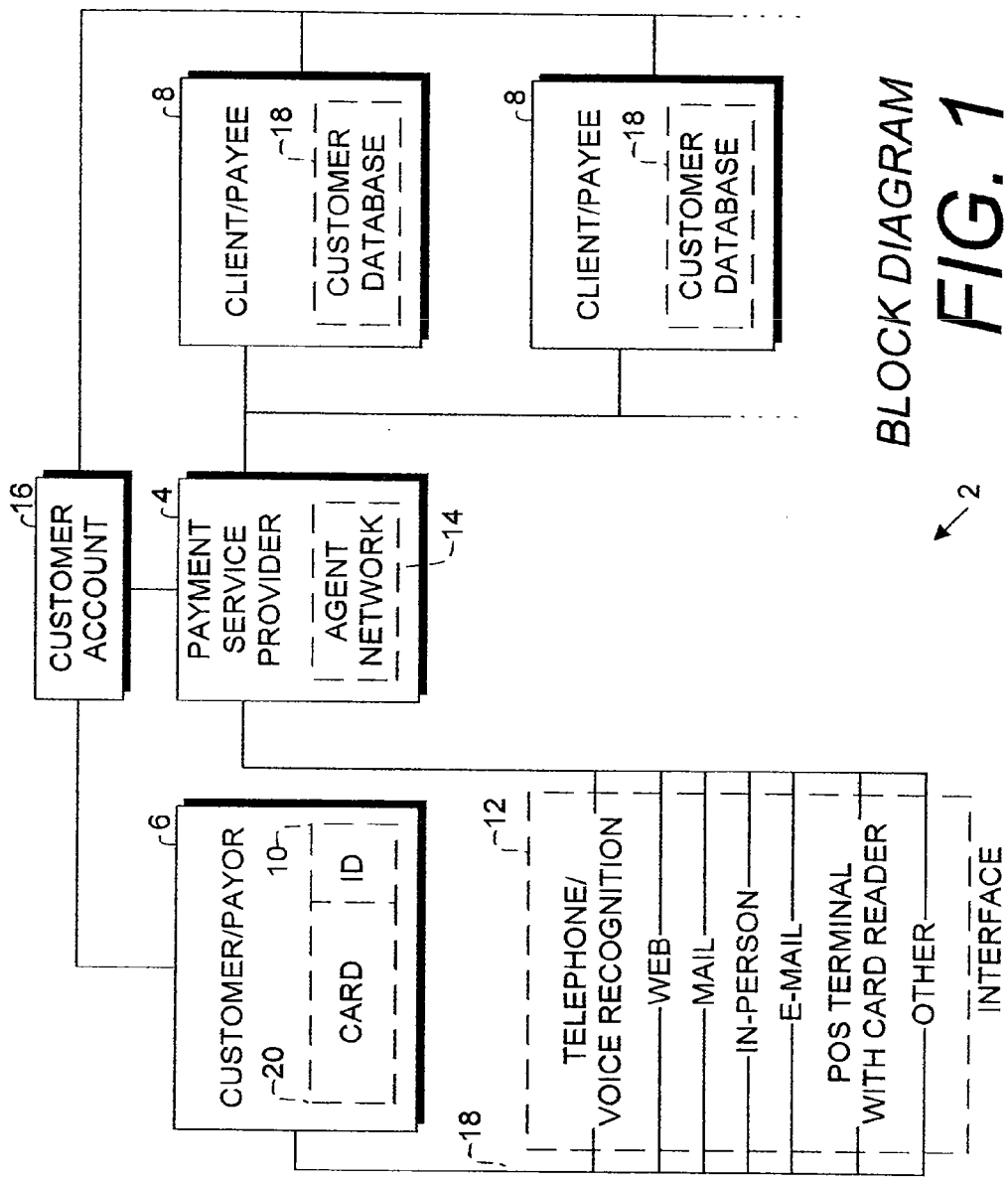
FIG. 1 is a block diagram of a payment service system embodying the present invention.

Referring the drawings in more detail, the reference numeral 2 generally designates a payment system embodying the present invention. As shown in the block diagram FIG. 1, the system 2 includes a payment service provider 4 for facilitating payment from a customers/payor 6 to one or more clients/payees 8.

Each customer/payor has a unique ID 10, which can comprise any suitable identifier. Conventional identifiers such as name, social security number, PIN, etc. are acceptable. Moreover, the system 2 can accommodate "anonymous" customer/payors 6. Such customers 6 can maintain their anonymity by creating their own ID's 10. The ID 10 can also comprise the customer's telephone. Thus, the system 2 could be used for paying for telephone services using only the customer's telephone number for identification purposes. The customer in this model does not even have to provide an address or any other personal information. Similar identification arrangements could be used with other clients 8, i.e. accepting payments on accounts with the customers identified by their respective account numbers. The customer 6 interfaces with the payment service provider 4 through an interface 12. The interface 12 can comprise any suitable form or device for communications, including telephone (which can incorporate voice recognition (VR)), worldwide web (Internet), mail, in-person, a point-of-sale (POS) terminal with a card reader, e-mail or any other suitable interface.

The payment service provider 4 can include an agent network 14 which can provide point-of-sale (POS) contact points system-wide for convenient in-person accessibility by the customers 6. The payment service provider 4 maintains customer accounts 16 which can correspond to the clients/payees 8. Each client/payee can have associated therewith a customer database 18 containing pertinent information regarding the customers 6 and their respective accounts 17. The designation of accounts, subaccounts, master accounts, etc. can vary from client-to-client. Thus, as used herein the terms "account", "subaccount" and similar terms can designate either the entire account base of a particular client 8, or the individual account of a customer(s) 6.

Figure 2:
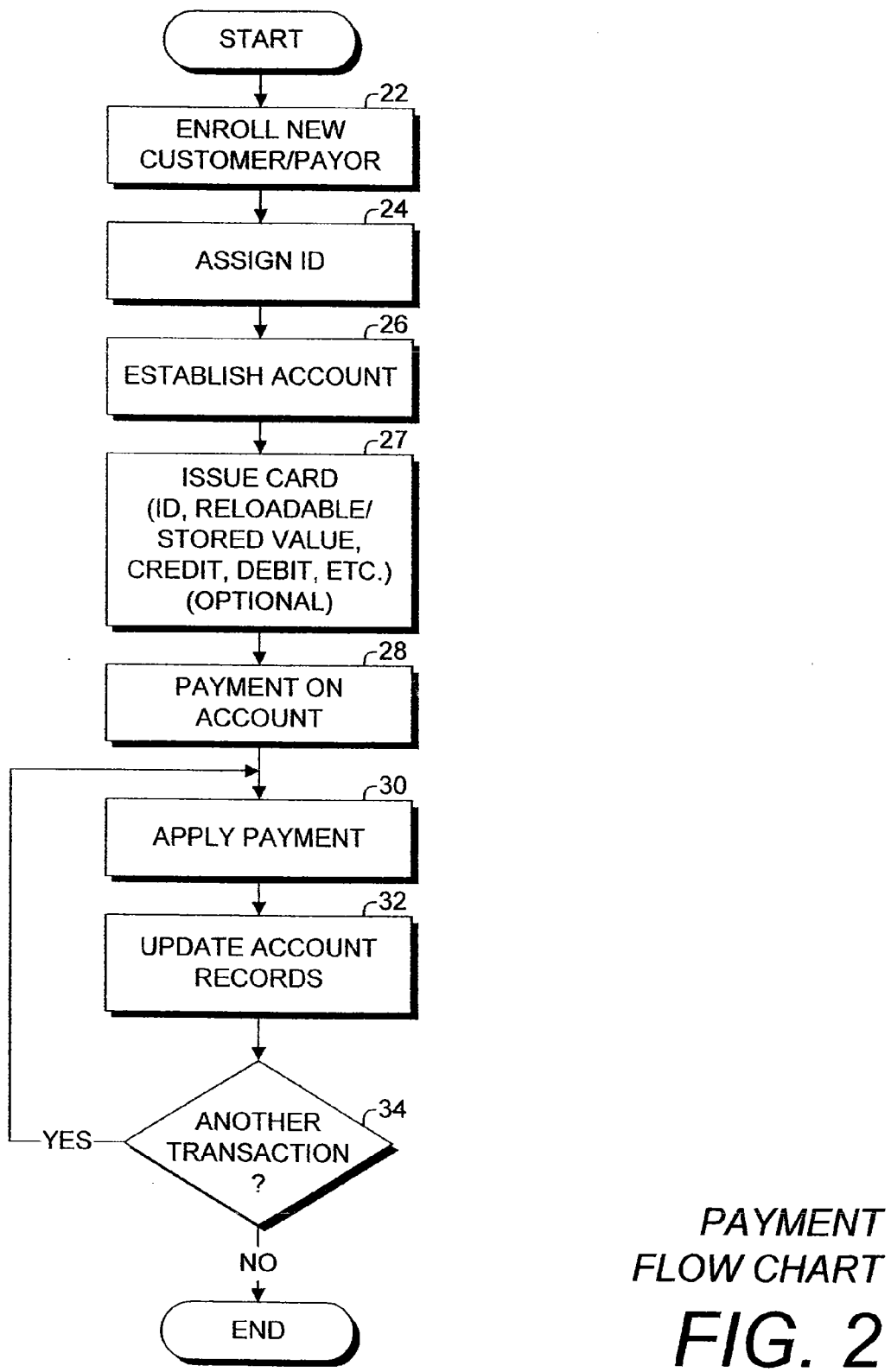
FIG. 2 is a flow chart for payments made in accordance with the method of the present invention.

FIG. 2 is a payment flow chart depicting a payment method which commences with the enrollment of a new customer/payor at 22 whereafter an ID 10 is assigned at 24. An account 17 is established with the payment service provider 4 at 26. Optionally a card 20 can be issued to the customer 6 at 27. The card 20 can comprise an ID card, a reloadable/stored value card, a credit card, a debit card, etc. Any suitable card configuration can be utilized. For example, preprinted cards with concealed customer ID's 10 can be inventoried with the agent network 14 for distribution upon enrollment. However, the system 2 can function without any cards whatsoever simply by assigning unique customer ID's 10 for purposes of conducting all payment transactions. A payment is made on the account at 28. The payment is applied at 30 and the subaccount records are updated at 32. A decision is made at a decision box 34 if another transaction is to be conducted. If so, the process returns to the payment application step 30 whereby the customer's payment can be applied to another account. If not, the process ends.

Figure 3:
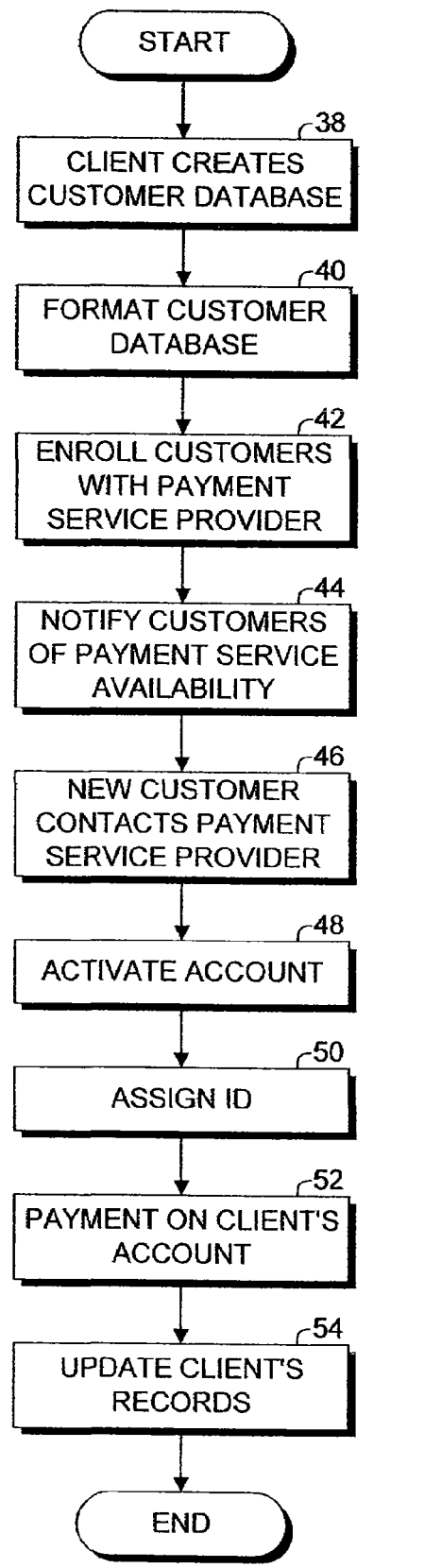
FIG. 3 is a flow chart of a method for enrolling customers.

FIG. 3 shows a method of enrolling the customer base of a client 8 including the step of the client creating a customer database at 38. At 40 the database is formatted, preferably pursuant to the standards established by the payment service provider 4 to facilitate automation of the payment process. All of the customers 6 in the client's customer database can automatically be enrolled in the payment service at 42. The customers 6 can be notified of the payment service availability at 44, whereupon the new customer can contact the payment service provider 4 at 46 and activate the account at 48. The customer ID 10 is assigned at 50, the customer makes a payment on a client's account at 52 and the client's records are updated at 54.

Figure 4:
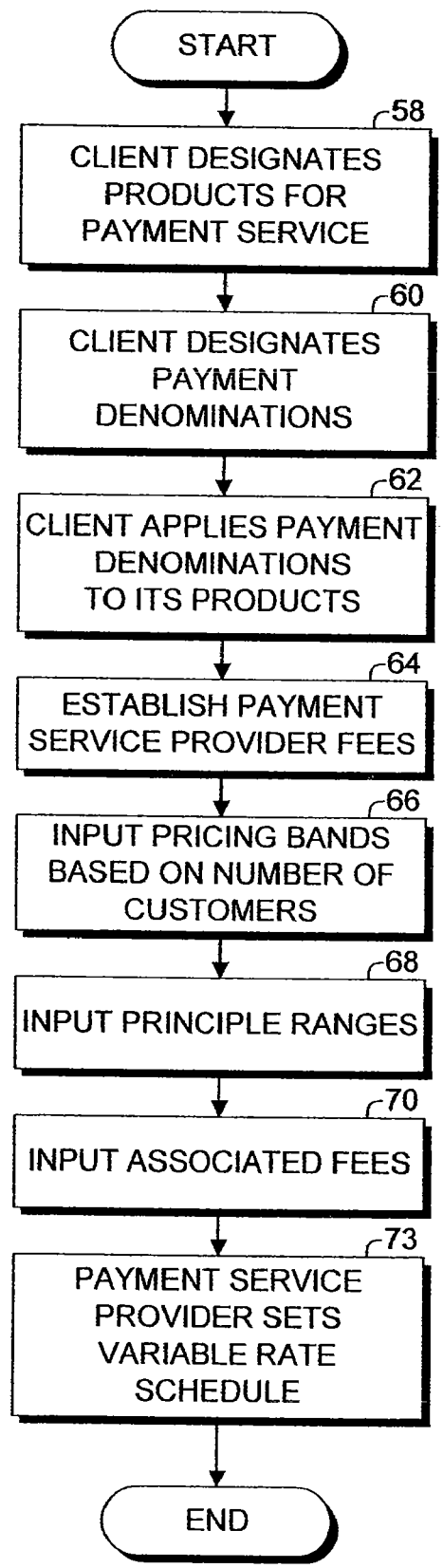
FIG. 4 is a flow chart for implementing payment parameters.

FIG. 4 shows a methodology for establishing payment parameters. At 58 the client designates the products for payment service. The system and method can accommodate clients with multiple products by allowing flexibility in establishing the payment parameters for each and by accommodating different payment directions from customers 6 on the various products. The client designates its payment denominations (e.g. $5, $10, $20, etc. increments) at 60 and applies the payment denominations to its products at 62. The payment service plan can optionally be configured to accept exact payments of any amount without applying predetermined payment denominations. Payment service provider fees are established at 64. The fees can reflect the nature of the clients' accounts. For example, payment bands can be input at 66 wherein various bands are applicable according to the number of customers. Pricing can also be based on the ranges of principle payment amounts at 68. The fees associated with the transactions are input at 70. The payment service provider 4 can set a variable fee schedule, taking into account factors such as pricing, principle and fee bands and ranges at 72.

Figure 5:
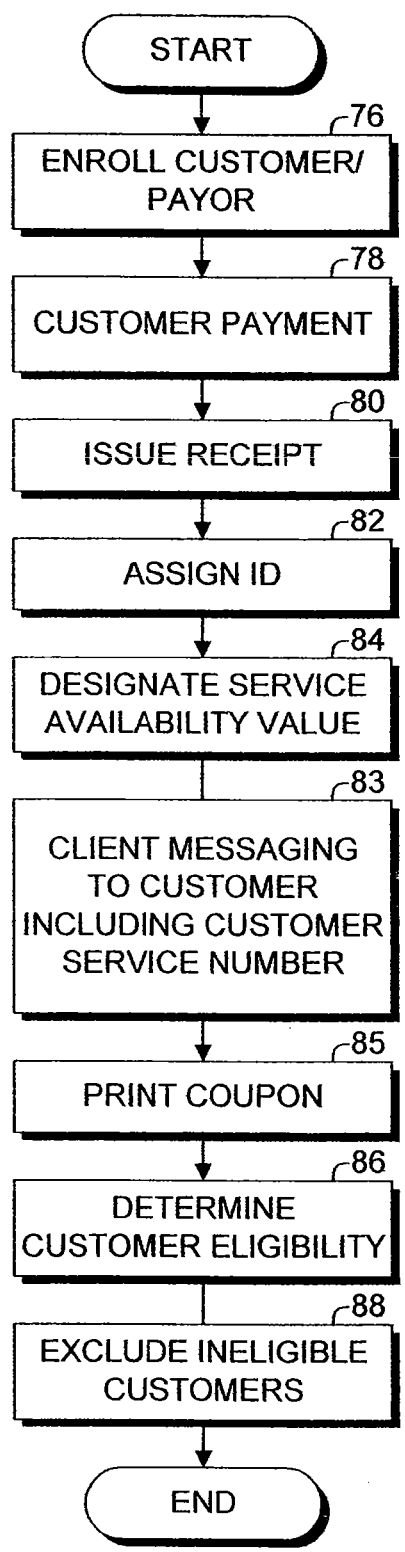
FIG. 5 is a flow chart for a dynamic client/customer interface.

FIG. 5 shows a dynamic client/customer interface methodology wherein the customer enrolls with the payment service provider at 76, makes a payment at 78 and is issued a receipt at 80. The customer is assigned an ID at 82. Client messaging to the customer is communicated at 83 and can include the customer service number. The value of the available payment service is designated at 84. A coupon is printed at 85 for eligible customers 6. Customer eligibility is determined at 86 and ineligible customers are excluded at 88.

Figure 6:
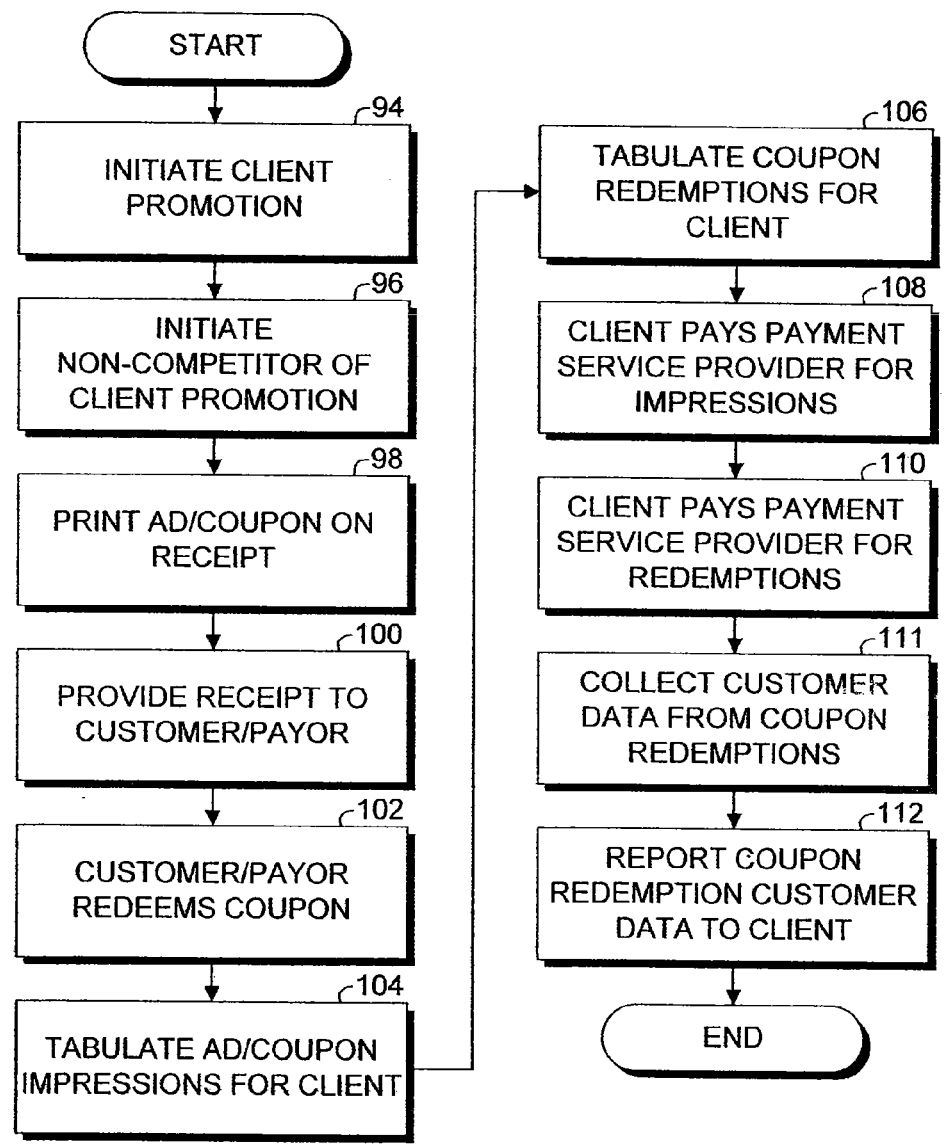
FIG. 6 is a flow chart for providing advertising and coupons on receipts for payments.

FIG. 6 shows an optional methodology for utilizing the customers' receipts for advertising and coupons. A client promotion is initiated at 94. Alternatively, a promotion can be initiated for a non-competitor of the client at 96. At 98 the advertising or coupons are printed on the receipts, which are provided to the customers at 100. The customers 6 can redeem the coupons at 102. At 104 the advertisement and coupon impressions are tabulated for each client and the coupon redemptions are tabulated at 106. The client pays the payment service provider at 108. Based on tabulated redemptions, the client can also pay the payment service provider at 110. Customer data is collected from the coupon redemptions at 111. The customer data can be manipulated in various ways and reported to the client at 112.

Figure 7:
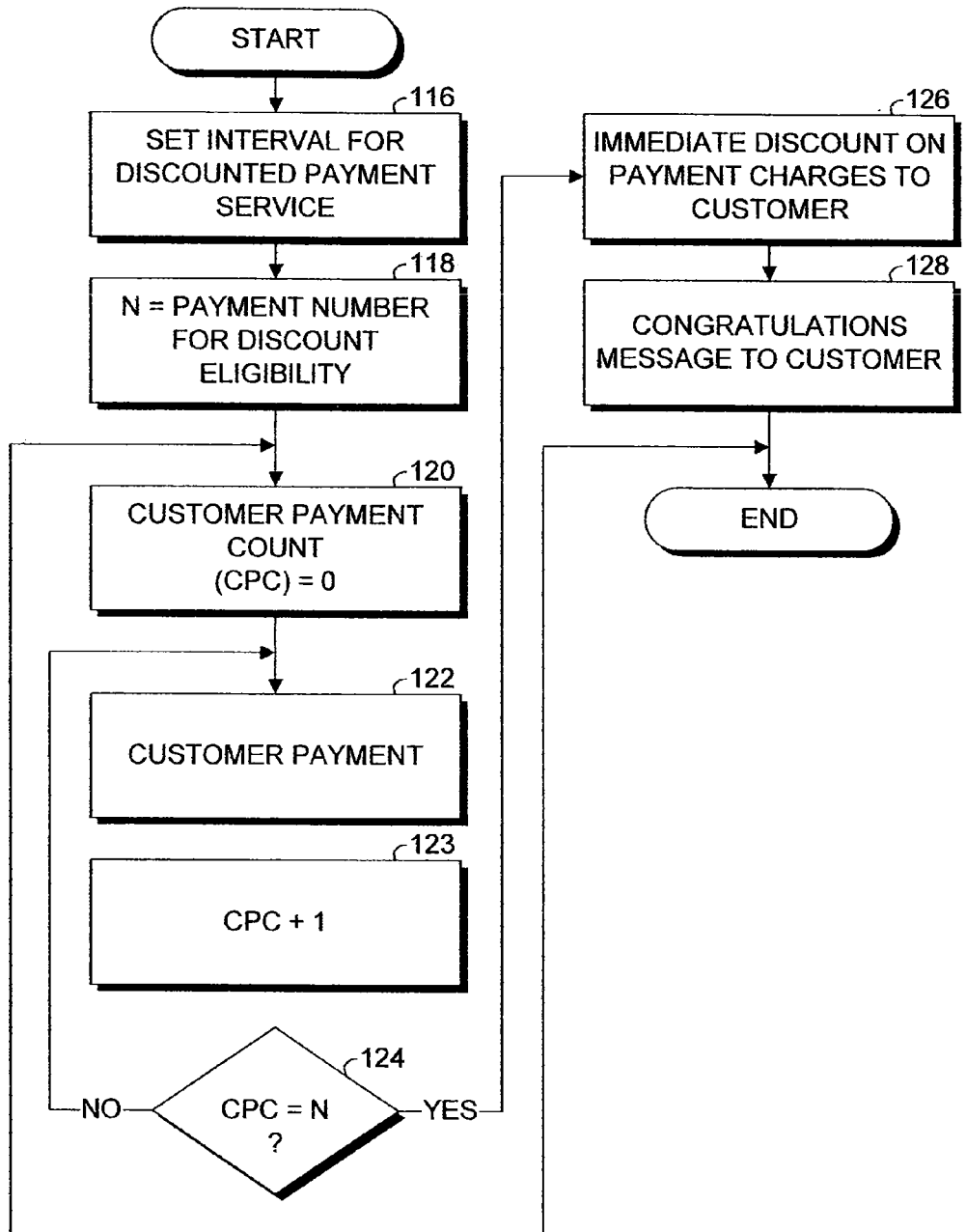
FIG. 7 is a flow chart for providing an automatic repeat customer discount.

FIG. 7 shows a procedure for rewarding repeat customers with discounts. At 116 the interval for the discounted payment service is set and a number of repeat transactions N is set at 118 in order to qualify for a discount. (N). A customer payment count (CPC) is set to zero at 120. A customer payment is made at 122 and increments the customer payment count (CPC+1) at 123. At a decision box 124 the customer payment count is compared to the number of payments required for discount eligibility (CPC=N?). If negative, the procedure returns to the customer payment step 122. If affirmative, an immediate discount can be provided on the current payment charge to the customer at 126. A congratulatory message to the customer is printed at 128, for example on the receipt.

Figure 8:
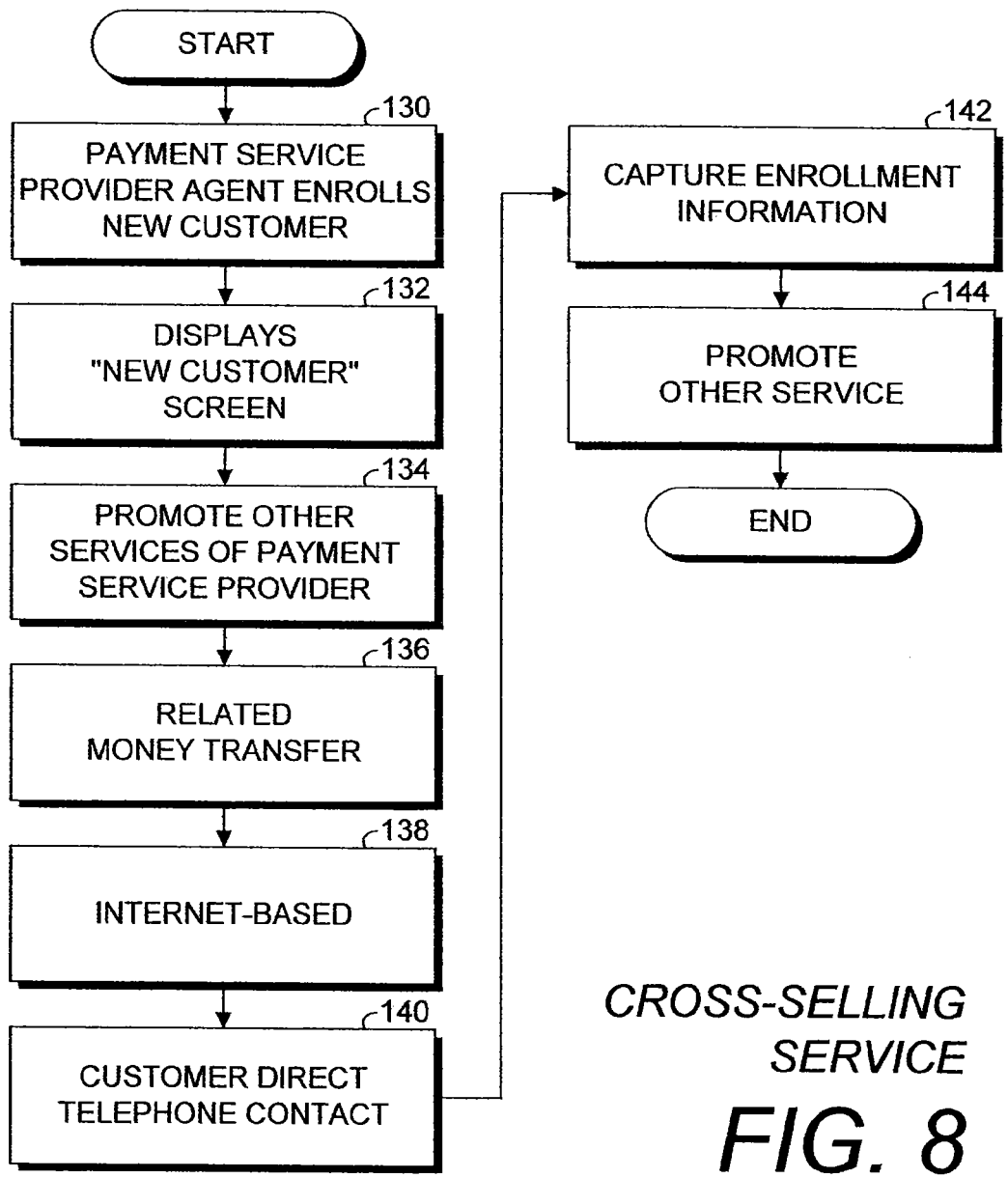
FIG. 8 is a flow chart for cross selling services of the client.

FIG. 8 shows a cross-selling methodology which commences with the step of a new customer enrollment at 130. A new customer screen is displayed at 132 for purposes of promoting other services of the payment service provider at 134. For example, other related money-transfer services of the payment service provider 4 could be promoted to the customer 6 at 136. Internet-based services can be promoted at 138 and direct telephone contact services can be promoted at 140. The enrollment information can be captured at 142, and can reflect the services utilized by the customer. Still other services can be promoted at 144.

Figure 9:
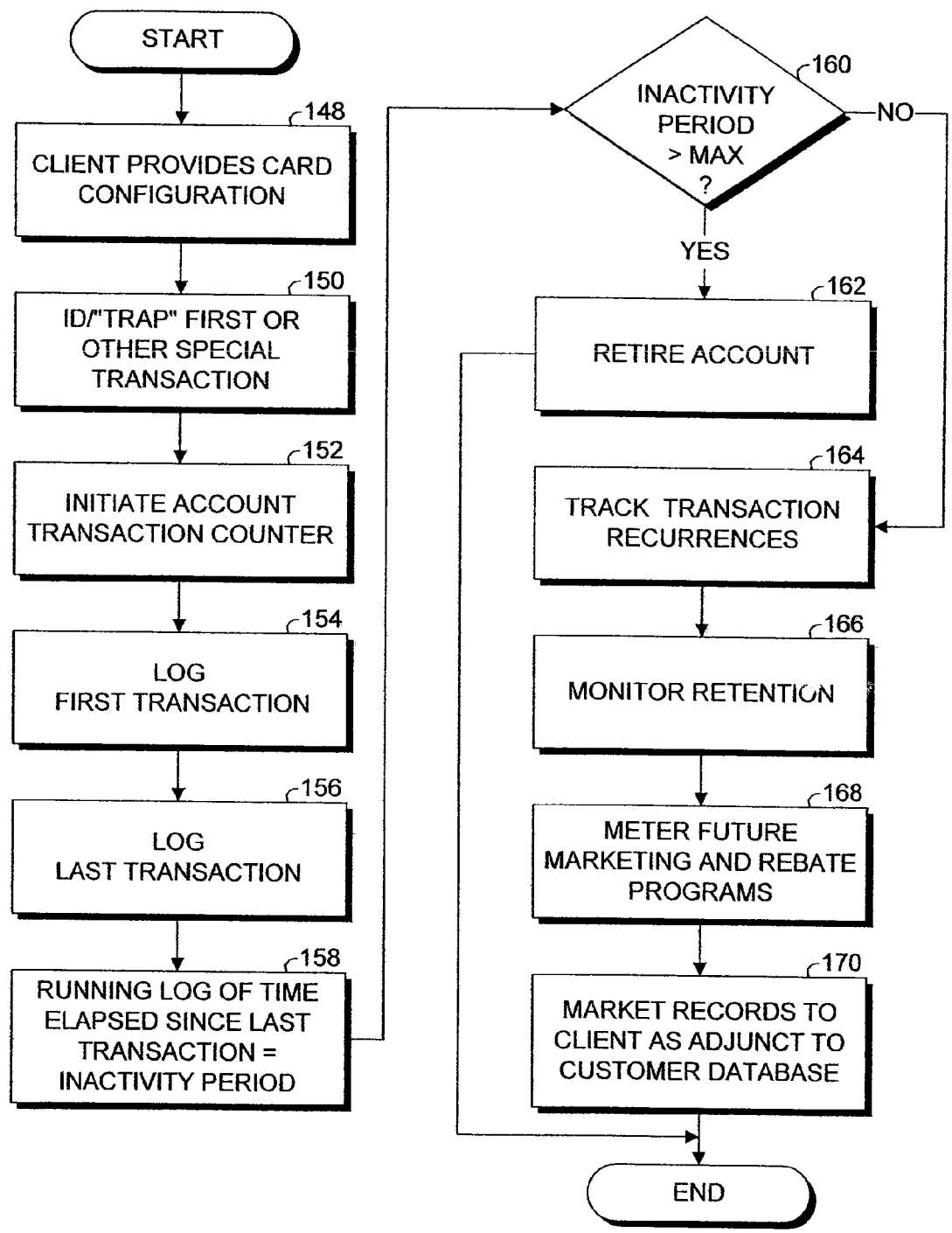
FIG. 9 is a flow chart for metering transactions involving accounts.

FIG. 9 shows a transaction metering procedure which commences with the client 8 providing the card configuration at 148. An ID "trap" occurs at 150 whereby a first or other special transaction is identified for special handling. An account transaction counter is initiated at 152 and a first transaction is logged at 154. A last transaction is logged at 156 and a running log of time elapsed since the last transaction (corresponding to an inactivity period) is maintained at 158. At decision box 160 a determination is made if the inactivity has exceeded the maximum allowable period. If affirmative, a retire account step occurs at 162 and the sub-routine ends. If negative, the sub-routine continues to track transaction recurrences at 164 and monitors retentions at 166. Future marketing and rebate programs are metered at 168 and market records are provided to the client at 170 based upon the data received in the above steps. The market records can be used as an adjunct to the client's customer database.

Figure 10:
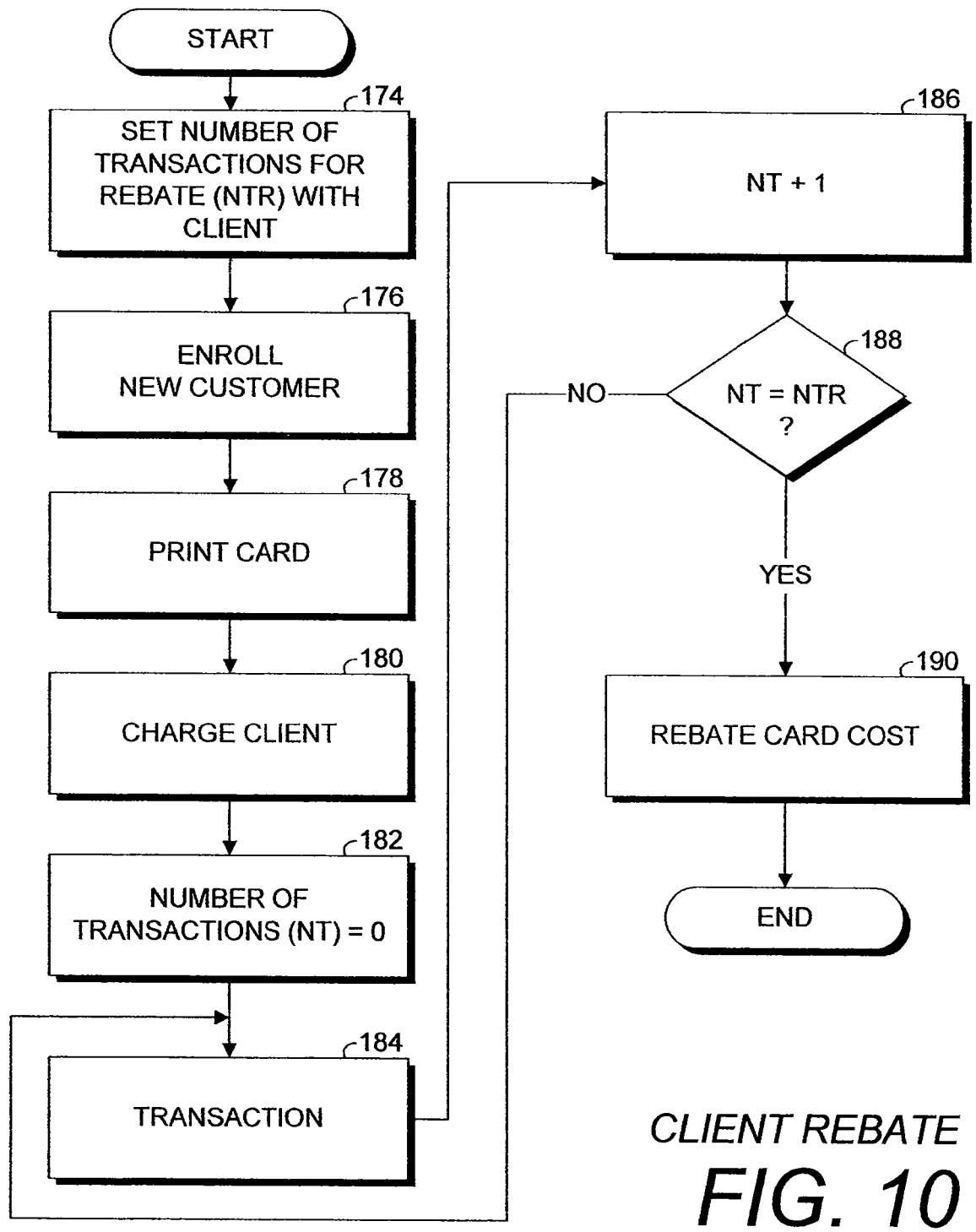
FIG. 10 is a flow chart for providing rebates to clients.

FIG. 10 shows a client rebate routine wherein a number of transactions required for rebate eligibility is set with the client at 174 (NTR). New customers are enrolled at 176, cards are printed at 178 and the clients 8 are charged at 180. The number of transactions (NT) is initialized to zero at 182, a transaction occurs at 184 and increments the number of transactions (NT+1) at 186. At decision box 188 a determination is made if NT=NTR? If affirmative, the cost of the card is rebated to the client at 190. If negative, the routine returns to the transaction step for the next increment.

Figure 11:
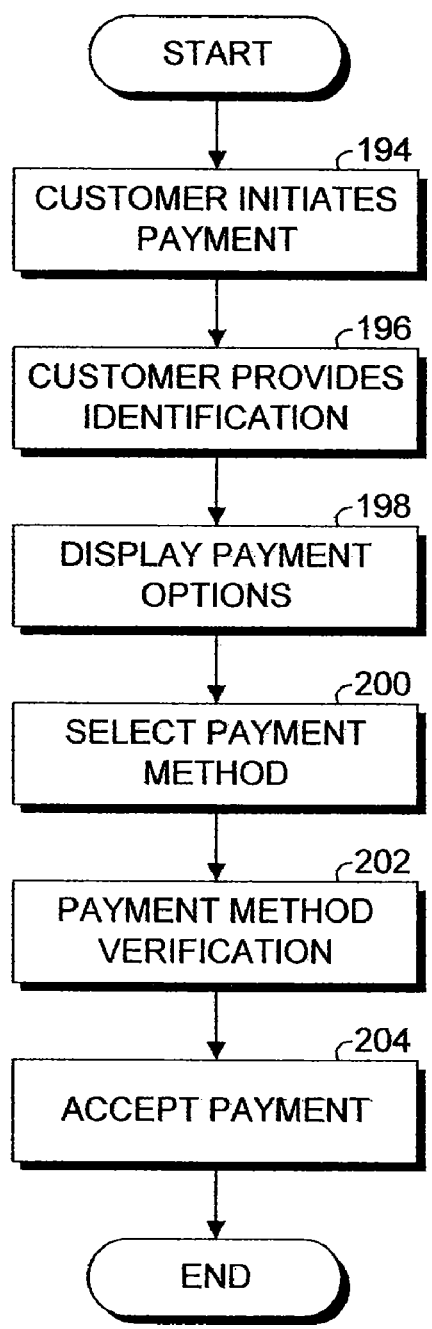
FIG. 11 is a flow chart for alternative payment methods.

FIG. 11 shows a methodology for making payments using various options. The customer initiates a payment at 194 and provides his or her ID at 196. Various payment options are displayed, and can include negotiable instruments (e.g. checks, cashier checks, money orders, etc.), credit cards, debit cards, etc. A payment method is selected at 200 and is verified at 202 to ensure that "good" (i.e., collectable) funds are available from the customer 6 utilizing the selected payment method. The payment is accepted at 204.

Figure 12:
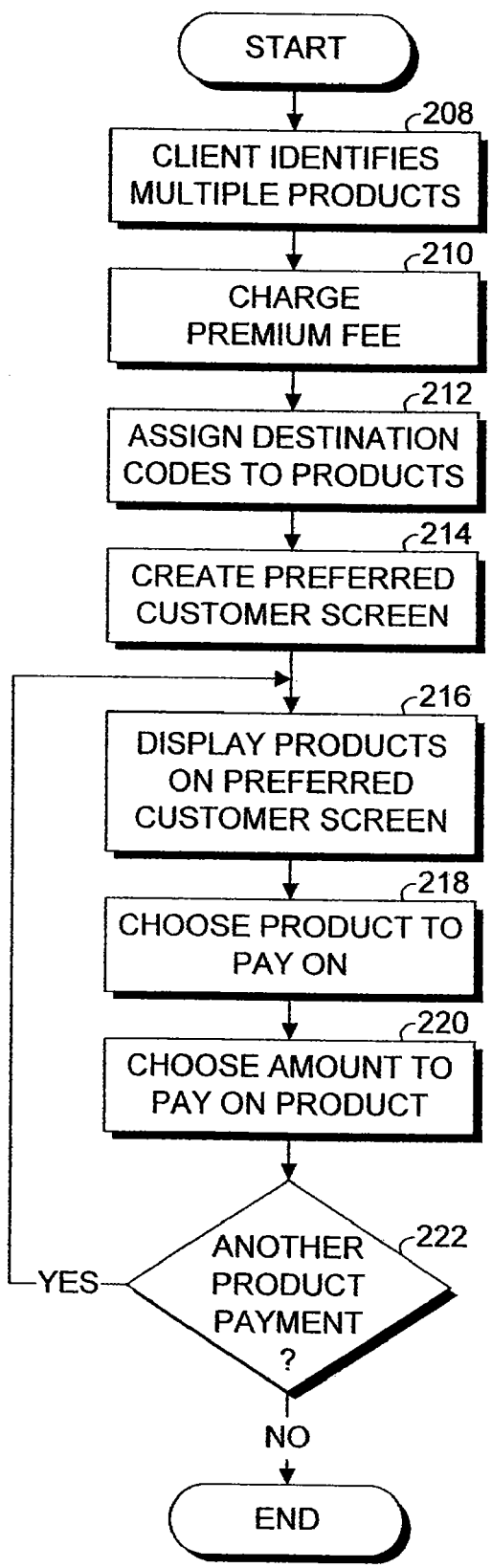
FIG. 12 is a flow chart for additional product support.

An additional product support procedure is shown in FIG. 12 and commences with the client 8 identifying multiple products to be supported at 208. For example, a telecommunications client might provide various products such as prepaid dialtone, prepaid cellular, prepaid internet access and insurance. All of these products could be provided on a single card. A premium fee could be charged by the payment service provider 4 at 210. Destination codes could be assigned to the client's various products and a preferred customer screen created for displaying same at 212, 214 respectively. The client's products would be displayed on the preferred customer screen at 216 whereby the customer could choose a product to pay on at 218. At 220 the customer chooses the the amount to pay on the chosen product. At decision box 222 the customer has the option of choosing another product to pay on. If affirmative, the preferred customer screen with the multiple products is displayed again. Otherwise, the sub-routine ends.

Figure 13:
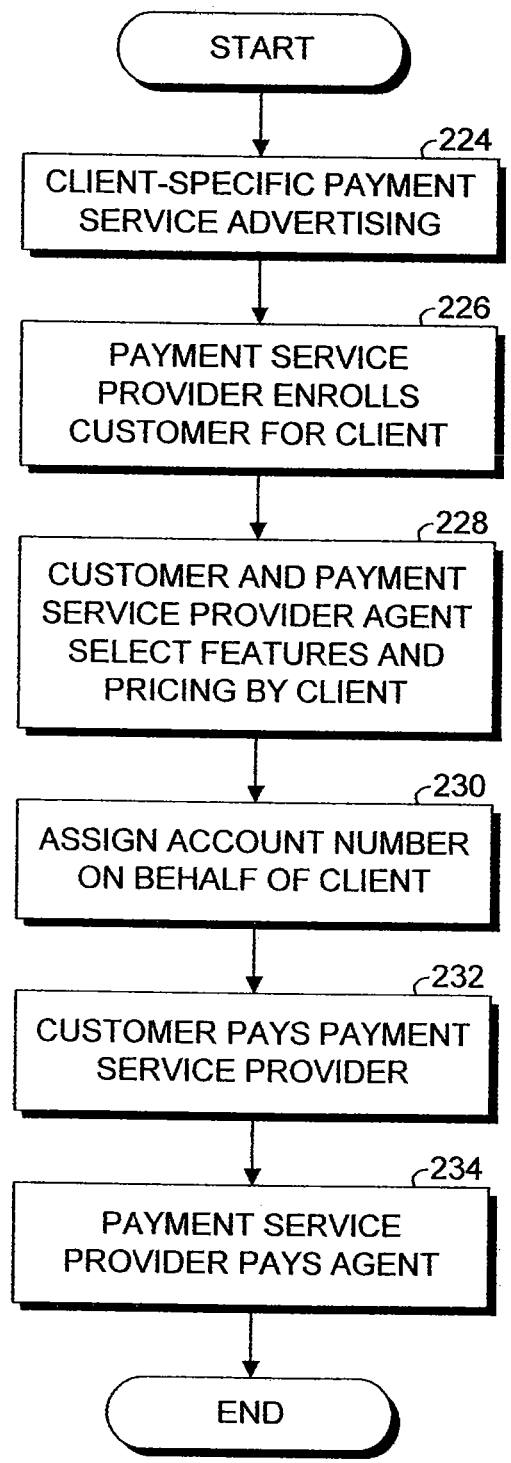
FIG. 13 is a flow chart for client-specific enrollment.

FIG. 13 shows a client-specific enrollment methodology, as contrasted with a generic enrollment procedure commencing with client-specific payment service advertising which identifies the payment service provider 4 and directs potential customers to its agent network 14. The payment service provider agent enrolls a customer on behalf of the client at 226. The customer is typically either a present or prospective customer for the client's goods or services and has been directed to the payment service providers agent network 14 as a way of paying for same. At 228 the customer and the payment service provider agent select the features and pricing desired by the customer for the client's products. An account number can optionally be assigned on behalf of the client by the payment service provider agent at 230. The payment service provider is paid by the customer at 232, and in turn pays the agent at 234.

What is claimed and desired to be secured by Letters Patent is as follows:

1. A payment service method, which comprises the steps of:
   a) a payment service provider contracting with a client to provide payment accounts to customers of the client, wherein a customer of the client enrolls with the payment service provider and thereafter pays funds into the payment account and uses the funds to purchase goods or services from the client;
   b) the payment service provider receiving account information comprising a set of account identifiers for the customers from the client, the set of identifiers forming a database comprising existing and future customer accounts, the set of identifiers being formatted into a customer database, the customer database being operated by the payment service provider;
   c) storing the account information in the consumer database;
   d) receiving a request from the customer to make a payment to a client account, wherein the customer is physically present at a payment service provider location;
   e) receiving identifying information from the customer;
   f) using the database to verify status of the client account;
   g) the payment service provider receiving a payment from the customer to purchase goods or services;
   h) using a computer to establish the payment account with the payment service provider for the customer, wherein the computer is capable of communicating with a storage medium;
   i) storing the payment account in the storage medium;
   j) the payment service provider issuing and assigning a unique identifier to the customer after enrolling with the payment service provider and for purposes of making payments, wherein the unique identifier is configured to provide the customer with access to the payment account to make further payments from the payment account without providing the identifying information;

k) crediting the payment account in an amount corresponding to the payment; and l) using a wire transfer to transfer the funds from the payment account to the client account upon receipt of the payment.

2. The method of claim 1, which includes the additional step of:

a) maintaining the anonymity of the customer.

3. The method of claim 2, wherein the unique identifier is a single, exclusive identifier and wherein the method includes the additional step of utilizing the single, exclusive identifier for the customer and associating the exclusive identifier with the payment account.

4. The method of claim 2, which includes the additional step of identifying said payment account solely by the unique identifier.

5. The method of claim 1, which includes the additional step of establishing an additional payment account for the customer and associating the additional payment account with an additional client.

6. The method of claim 1, which includes the additional step of said payment service provider reporting to the client activity associated with customers of said client.

7. The method of claim 1, which includes the additional steps of:

a) said payment service provider maintaining an agent network; and b) said customers communicating with said payment service provider through said agent network.

8. The method of claim 7, which includes the additional steps of:

a) enrolling the customers with said payment service provider through said agent network; and b) said payment service provider paying a fee to an agent in the agent network for each of the customers enrolled by the agent.

9. The method of claim 1, which includes the additional step of:

(a) formatting a customer database of the client for use by the payment service provider.

10. The method of claim 1, which includes the additional steps of:

a) establishing with said payment service provider an account group comprising the customers of the client; and b) activating individual accounts upon enrollment of the customers.

11. The method of claim 1, which includes the additional steps of:

a) the client designating products for the payment service;

b) the client designating payment denominations for each of the designated products;

c) establishing payment service provider fees;

d) inputting pricing bands based on the number of the customers of the client for the products;

e) inputting principle ranges for the products;

f) inputting associated fees for the products; and g) setting a variable fee schedule for the payment service provider.

12. The method of claim 1, which includes the additional steps of:

a) printing a receipt for the customer upon receipt of payment from the customer;

b) printing the unique identifier on the receipt;

c) designating a service availability value on the receipt; and d) printing on the receipt a commercial message from the client to the customer.

13. The method of claim 1, which includes the additional step of:

a) printing coupons for use by said customer.

14. The method of claim 1, which includes the additional steps of:

a) setting criteria for customer eligibility for said payment accounts; and b) excluding ineligible customers from a database of eligible customers for said payment accounts.

15. The method of claim 1, which includes the additional step of:

a) communicating to said customer promotional information from said client.

16. The method of claim 1, which includes the additional step of:

a) communicating to said customer commercial messages from third parties, wherein said third parties do not compete with the client.

17. The method of claim 1, which includes the additional steps of:

a) activating a card for said customer; and b) storing the unique identifier on the card.

18. The method of claim 17, which includes the additional step of:

a) concealing the unique identifier on the card.

19. The method of claim 17, wherein said card comprises one of the group comprising: a credit card; a debit card; and a prepay card.

20. The method of claim 1, wherein the customer interfaces with the payment service provider by one of a method from among the group consisting of:

a) telephone with voice recognition;

b) Internet global computer network;

c) mail;

d) in person;

e) e-mail; and f) point-of-sale (POS) terminal with card reader.

21. The method of claim 1, which includes the additional steps of:

a) the payment service provider tabulating advertising and coupon impressions for the client;

b) the payment service provider tabulating coupon redemptions for the client;

c) the client paying the payment service provider for impressions;

d) the client paying the payment service provider for redemptions;

e) collecting customer data from coupon redemptions; and f) reporting coupon redemption customer data to the client.

22. The method of claim 1, which includes the additional steps of:

a) setting an interval for a discounted payment service;

b) counting customer payments; and c) discounting a customer payment upon reaching said interval.

23. The method of claim 1, which includes the additional steps of:

a) displaying a new customer screen upon enrollment of a new customer by said payment service provider;

b) capturing enrollment information concerning said new customer; and c) promoting other services of one of said payment service provider and said client to said customer.

24. The method of claim 1, which includes the additional steps of:
   a) establishing a maximum permissible inactivity period;
   b) logging customer transactions and comparing same to said maximum inactivity period;
   c) detecting accounts which exceed said maximum allowable inactivity period; and
   d) retiring said accounts which exceed the maximum allowable inactivity period.

25. The method of claim 1, which includes the additional steps of:
   a) tracking customer transaction recurrences;
   b) monitoring customer retention;
   c) metering future marketing and rebate programs for the client based on transaction recurrences and customer retention; and
   d) the payment service provider providing customer transaction records to the client.

26. The method of claim 1, which includes the additional steps of:
   a) setting a required number of transactions for rebate with the client;
   b) counting said transactions with the client; and
   c) rebating the cost of customer cards to the client upon reaching the number of transactions required for rebate eligibility.

27. The method of claim 1, which includes the additional steps of:
   a) the client identifying products to the payment service provider;
   b) displaying the products to the customer;
   c) the customer selecting one or more of the products to pay on;
   d) the customer selecting one or more amounts to pay on the selected products; and
   e) making said selected payments on said selected products.

28. The method of claim 1, which includes the additional steps of:
   a) providing client-specific advertising;
   b) the payment service provider enrolling customers for the client; and
   c) the customer and the payment service provider selecting features and pricing offered by the client.

* * * * *